(12) United States Patent
Meyer et al.

(10) Patent No.: US 8,071,215 B2
(45) Date of Patent: Dec. 6, 2011

(54) HYDROPHOBIC SILICA AND ITS USE IN SILICONE RUBBER

(75) Inventors: Jürgen Meyer, Stockstadt (DE); Mario Scholz, Gründau (DE)

(73) Assignee: Evonik Degussa GmbH, Essen (DE)

( * ) Notice: Subject to any disclaimer, the term of this patent is extended or adjusted under 35 U.S.C. 154(b) by 733 days.

(21) Appl. No.: 11/718,480

(22) PCT Filed: Oct. 29, 2005

(86) PCT No.: PCT/EP2005/011606
§ 371 (c)(1),
(2), (4) Date: May 2, 2007

(87) PCT Pub. No.: WO2006/053632
PCT Pub. Date: May 26, 2006

(65) Prior Publication Data
US 2009/0076194 A1   Mar. 19, 2009

(30) Foreign Application Priority Data

Nov. 18, 2004  (DE) .......................... 10 2004 055 585
Nov. 18, 2004  (DE) .......................... 10 2004 055 586

(51) Int. Cl.
*B32B 5/16*   (2006.01)

(52) U.S. Cl. ........ 428/405; 428/403; 524/588; 524/492; 427/212; 427/215; 427/220

(58) Field of Classification Search ................ 524/492, 524/588; 428/403, 405; 427/212, 215, 220
See application file for complete search history.

(56) References Cited

U.S. PATENT DOCUMENTS

| | | | |
|---|---|---|---|
| 6,328,944 B1 | 12/2001 | Mangold et al. | |
| 6,331,588 B1 | 12/2001 | Azechi et al. | |
| 2002/0168524 A1 * | 11/2002 | Kerner et al. | ................. 428/405 |
| 2003/0089279 A1 | 5/2003 | Meyer et al. | |

FOREIGN PATENT DOCUMENTS

| | | |
|---|---|---|
| DE | 196 50 500 A1 | 6/1998 |
| DE | 199 43 666 A1 | 3/2001 |
| EP | 1 236 773 A2 | 9/2002 |
| WO | WO 2004/005393 A1 | 1/2004 |
| WO | WO 2004/033544 A1 | 4/2004 |

* cited by examiner

*Primary Examiner* — Margaret Moore
(74) *Attorney, Agent, or Firm* — Smith, Gambrell & Russell, LLP

(57) ABSTRACT

Hydrophobic pyrogenic silica doped with potassium by means of aerosol is prepared by reacting a pyrogenic silica doped with potassium by means of aerosol with a surface-modifying agent. It can be used as a filler in silicone rubber.

12 Claims, No Drawings

HYDROPHOBIC SILICA AND ITS USE IN SILICONE RUBBER

CROSS-REFERENCE TO RELATED APPLICATIONS

This application claims the benefit of priority of German Patent Application Nos. 10 2004 055 585.0 and 10 2004 055 586.9, both filed Nov. 18, 2004, and International Application No. PCT/EP2005/011606 filed Oct. 29, 2005, all of which are relied on and incorporated herein by reference.

INTRODUCTION AND BACKGROUND

The invention relates to a hydrophobic silica, to a process for its preparation and to its use in silicone rubber.

It is known to use pyrogenic silica that has been rendered hydrophobic as a filler in silicone rubber (DE 199 43 666 A1).

U.S. Pat. No. 6,331,588 describes LSR-silicone rubbers which contain pyrogenic silicas as filler. In order to avoid the undesirable influence of the silanol groups on the rheological properties of the silicone rubber it is necessary according to U.S. Pat. No. 6,331,588 to render the surface of the pyrogenic silica hydrophobic.

According to the prior art, in the case of LSR (liquid silicone rubber), either a hydrophilic silica is rendered hydrophobic in situ and at the same time exposed to very high shear forces so that the viscosity and the flow limit can be lowered, or a silica that has already been rendered hydrophobic is exposed to high shear forces for the same reason.

A hydrophilic silicon dioxide (silica) doped with potassium by means of aerosol is known from DE 19650500 A1.

A surface-modified silicon dioxide doped with potassium is generally known from EP 1236773 A2. The KCl solution used therein has a concentration of 0.5 KCl.

The K content of the hydrophilic silicon dioxide is 300 μg/g. A specially designed surface-modified, potassium-doped silicon dioxide is not described in EP 1236773 A2.

SUMMARY OF THE INVENTION

The invention provides a hydrophobic silicon dioxide which has been prepared pyrogenically in the manner of flame oxidation or, preferably, of flame hydrolysis and which has been doped with from 0.000001 to 40 wt. % potassium.

In an embodiment of the invention, the BET surface area of the doped oxide may be from 10 to 1000 m²/g and the DBP absorption of the pyrogenic oxide may be undetectable or less than 85% of the normal value of this pyrogenic silica.

In a preferred embodiment of the invention, the amount of potassium used for doping may be in the range from 1 to 20,000 ppm. In particular, the potassium content of the silicon dioxide before the surface modification may be from 0.15 to 0.32 wt. % in the form of $K_2O$.

The hydrophobic nature of the silica can be established by means of surface modification.

DETAILED DESCRIPTION OF THE INVENTION

The surface modification can be carried out with one or more compounds from the following groups:

a) organosilanes of type $(RO)_3Si(C_nH_{2n+1})$ and $(RO)_3Si(C_nH_{2n-1})$
  R=alkyl, such as, for example, methyl, ethyl, n-propyl, isopropyl, butyl
  n=1-20 b) organosilanes of type $R'_x(RO)_ySi(C_nH_{2n+1})$ and $R'_x(RO)_ySi(C_nH_{2n-1})$
  R=alkyl, such as, for example, methyl, ethyl, n-propyl, isopropyl, butyl
  R'=alkyl, such as, for example, methyl, ethyl, n-propyl, isopropyl, butyl
  R'=cycloalkyl
  n=1-20
  x+y=3
  x=1,2
  y=1,2 c) haloorganosilanes of type $X_3Si(C_nH_{2n+1})$ and $X_3Si(C_nH_{2n-1})$
  X=Cl, Br
  n=1-20 d) haloorganosilanes of type $X_2(R')Si(C_nH_{2n+1})$ and $X_2(R')Si(C_nH_{2n-1})$
  X=Cl, Br
  R'=alkyl, such as, for example, methyl, ethyl, n-propyl, isopropyl, butyl
  R'=cycloalkyl
  n=1-20 e) haloorganosilanes of type $X(R')_2Si(C_nH_{2n+1})$ and $X(R')_2Si(C_nH_{2n-1})$
  X=Cl, Br
  R'=alkyl, such as, for example, methyl, ethyl,
  R'=cycloalkyl
  n-propyl, isopropyl, butyl
  n=1-20 f) organosilanes of type $(RO)_3Si(CH_2)_m$—R'
  R=alkyl, such as methyl, ethyl, propyl
  m=0,1-20
  R'=methyl, aryl (for example —$C_6H_5$, substituted phenyl radicals)
    —$C_4F_9$, —$OCF_2$—CHF—$CF_3$, —$C_6F_{13}$, —O—$CF_2$—$CHF_2$
    —$NH_2$, —$N_3$, —SCN, —CH=$CH_2$, —NH—$CH_2$—$CH_2$—$NH_2$,
    —N—($CH_2$—$CH_2$—$NH_2$)$_2$
    —OOC($CH_3$)C=$CH_2$
    —$OCH_2$—CH(O)$CH_2$
    —NH—CO—N—CO—($CH_2$)$_5$
    —NH—COO—$CH_3$, —NH—COO—$CH_2$—$CH_3$,
    —NH—($CH_2$)$_3$Si (OR)$_3$
    —$S_x$—($CH_2$)$_3$Si(OR)$_3$, wherein X=from 1 to 10 and R=alkyl, such as methyl, ethyl, propyl, butyl
    —SH
    —NR'R''R''' (R'=alkyl, aryl; R''=H, alkyl, aryl; R'''=H, alkyl, aryl, benzyl, $C_2H_4NR''''R'''''$ where R''''=A, alkyl and R'''''=H, alkyl)

g) organosilanes of type $(R'')_x(RO)_ySi(CH_2)_m$—R'

$R''$ = alkyl    $x + y = 2$
      = cycloalkyl    $x = 1, 2$
              $y = 1, 2$
              $m = 0, 1$ to $20$ R'=methyl, aryl (for example —$C_6H_5$, substituted phenyl radicals)
    —$C_4F_9$, —$OCF_2$—CHF—$CF_3$, —$C_6F_{13}$, —O—$CF_2$—$CHF_2$
    —$NH_2$, —$N_3$, —SCN, —CH=$CH_2$, —NH—$CH_2$—$CH_2$—$NH_2$, —N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si(OR)$_3$, wherein X=from 1 to 10 and R=methyl, ethyl, propyl, butyl
—SH—NR'R"R'"(R'=alkyl, aryl; R"=H, alkyl, aryl; R'"=H, alkyl, aryl, benzyl, C$_2$H$_4$NR""R'" where R""=A, alkyl and R""'=H, alkyl)

h) haloorganosilanes of type X$_3$Si(CH$_2$)$_m$—R'
 X=Cl, Br
 m=0,1-20
 R'=methyl, aryl (for example —C$_6$H$_5$, substituted phenyl radicals)
  —C$_4$F$_9$, —OCF$_2$—CHF—CF$_3$, —C$_6$F$_{13}$, —O—CF$_2$—CHF$_2$
  —NH$_2$, —N$_3$, —SCN, —CH=CH$_2$,
  —NH—CH$_2$—CH$_2$—NH$_2$
  —N—(CH$_2$—CH$_2$—NH$_2$)$_2$
  —OOC(CH$_3$)C=CH$_2$
  —OCH$_2$—CH(O)CH$_2$
  —NH—CO—N—CO—(CH$_2$)$_5$
  —NH—COO—CH$_3$, —NH—COO—CH$_2$—CH$_3$,
  —NH—(CH$_2$)$_3$Si(OR)$_3$
  —S$_x$—(CH$_2$)$_3$Si(OR)$_3$, wherein X=from 1 to 10 and R=methyl, ethyl, propyl, butyl
  —SH i) haloorganosilanes of type (R)X$_2$Si(CH$_2$)$_m$—R'
 X=Cl, Br
 R=alkyl, such as methyl, ethyl, propyl
 m=0,1-20
 R'=methyl, aryl (e.g. —C$_6$H$_5$, substituted phenyl radicals)
  —C$_4$F$_9$, —OCF$_2$—CHF—CF$_3$, —C$_6$F$_{13}$, —O—CF$_2$—CHF$_2$
  —NH$_2$, —N$_3$, —SCN, —CH=CH$_2$, —NH—CH$_2$—CH$_2$—NH$_2$,
  —N—(CH$_2$—CH$_2$—NH$_2$)$_2$
  —OOC(CH$_3$)C=CH$_2$
  —OCH$_2$—CH(O)CH$_2$
  —NH—CO—N—CO—(CH$_2$)$_5$
  —NH—COO—CH$_3$, —NH—COO—CH$_2$—CH$_3$,
  —NH—(CH$_2$)$_3$Si(OR)$_3$, wherein R=methyl, ethyl, propyl, butyl
  —S$_x$—(CH$_2$)$_3$Si(OR)$_3$, wherein R=methyl, ethyl, propyl, butyl and X=from 1 to 10
  —SH j) haloorganosilanes of type (R)$_2$X Si(CH$_2$)$_m$—R'
 X=Cl, Br
 R=alkyl, such as methyl, ethyl, propyl, butyl
 m=0,1-20
 R'=methyl, aryl (e.g. —C$_6$H$_5$, substituted phenyl radicals)
  —C$_4$F$_9$, —OCF$_2$—CHF—CF$_3$, —C$_6$F$_{13}$, —O—CF$_2$—CHF$_2$
  —NH$_2$, —N$_3$, —SCN, —CH=CH$_2$, —NH—CH$_2$—CH$_2$—NH$_2$,
  —N—(CH$_2$—CH$_2$—NH$_2$)$_2$
  —OOC(CH$_3$)C=CH$_2$
  —OCH$_2$—CH(O)CH$_2$
  —NH—CO—N—CO—(CH$_2$)$_5$
  —NH—COO—CH$_3$, —NH—COO—CH$_2$—CH$_3$,
  —NH—(CH$_2$)$_3$Si(OR)$_3$
  —S$_x$—(CH$_2$)$_3$Si(OR)$_3$, wherein X=from 1 to 10 and R=methyl, ethyl, propyl, butyl
  —SH k) silazanes of type

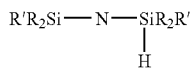

R=alkyl
R'=alkyl, vinyl l) cyclic polysiloxanes of type D 3, D 4, D 5, wherein D 3, D 4 and D 5 are understood as being cyclic polysiloxanes having 3, 4 or 5 units of type —O—Si(CH$_3$)$_2$—.
E.g. octamethylcyclotetrasiloxane=D 4

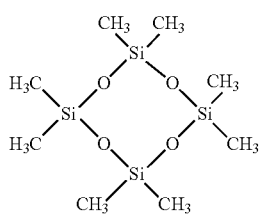

m) polysiloxanes or silicone oils of type

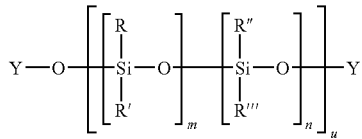

m=0,1,2,3, ... ∞
n=0,1,2,3, ... ∞
u=0,1,2,3, ... ∞
Y=CH$_3$, H, C$_n$H$_{2n+1}$ n=1-20
Y=Si(CH$_3$)$_3$, Si(CH$_3$)$_2$H
Si(CH$_3$)$_2$OH, Si(CH$_3$)$_2$(OCH$_3$)
Si(CH$_3$)$_2$(C$_n$H$_{2n+1}$) n=1-20
R=alkyl, such as C$_n$H$_{2n+1}$, wherein n is from 1 to 20, aryl, such as phenyl and substituted phenyl radicals, (CH$_2$)$_n$—NH$_2$, H
R'=alkyl, such as C$_n$H$_{2n+1}$, wherein n is from 1 to 20, aryl, such as phenyl and substituted phenyl radicals, (CH$_2$)$_n$—NH$_2$, H
R"=alkyl, such as C$_n$H$_{2n+1}$, wherein n is from 1 to 20, aryl, such as phenyl and substituted phenyl radicals, (CH$_2$)$_n$—NH$_2$, H
R'"=alkyl, such as C$_n$H$_{2n+1}$, wherein n is from 1 to 20, aryl, such as phenyl and substituted phenyl radicals, (CH$_2$)$_n$—NH$_2$, H The invention further provides a process for the preparation of the surface-modified, potassium-doped, pyrogenically prepared silicon dioxide according to the invention, which process is characterised in that the pyrogenically prepared silicon dioxide doped with potassium by means of aerosol is placed in a suitable mixing vessel, the silicon dioxide is sprayed, with intensive mixing, optionally first with water and/or dilute acid and then with the surface-modifying reagent or with a mixture of a plurality of surface-modifying reagents, and mixing is optionally continued for a further 15 to 30 minutes, followed by tempering at a temperature of from 100 to 400° C. for a period of from 1 to 6 hours.

The water that is used can be acidified to a pH value of from 7 to 1 with an acid, for example hydrochloric acid. The surface-modifying reagent that is used can be dissolved in a suitable solvent, such as, for example, ethanol. The mixing and/or tempering can be carried out in a protecting gas atmosphere, such as, for example, nitrogen.

The invention further provides a process for the preparation of the surface-modified, pyrogenically prepared silicon dioxide doped with potassium by means of aerosol according to the invention, which process is characterised in that, with the exclusion of oxygen, the silicon dioxide is mixed as homogeneously as possible with the surface-modifying reagent, the mixture, together with small amounts of steam and, optionally, together with an inert gas, is heated to temperatures of from 200 to 800° C., preferably from 400 to 600° C., in a continuous uniflow process in a treatment chamber which is in the form of a vertical tubular furnace, the solid and gaseous reaction products are separated from one another, and then the solid products are optionally deacidified and dried.

The pyrogenically prepared silicon dioxide doped with potassium by means of aerosol can be prepared by feeding an aerosol into a flame such as is used for preparing pyrogenic silicon dioxide by means of flame hydrolysis in known manner, mixing the aerosol homogeneously before the reaction with the gas mixture of the flame oxidation or flame hydrolysis, allowing the aerosol/gas mixture to react completely in a flame, and separating the resulting potassium-doped, pyrogenically prepared silicon dioxide from the gas stream in a known manner, there being used as the starting material of the aerosol a salt solution or suspension that comprises a potassium salt, the aerosol being produced by atomisation by means of a binary nozzle or by an aerosol generator, preferably by the ultrasonic method, or by a different type of aerosol production.

The aqueous potassium chloride solution can have a concentration of from 2.4 to 9.0 wt. % potassium chloride.

The process of flame hydrolysis for the preparation of pyrogenic silicon dioxide is known from Ullmanns Enzyklopädie der technischen Chemie, 4th Edition, Volume 21, page 464.

The process for the preparation of pyrogenically prepared silicon dioxide doped by means of aerosol is known from DE 19650500.

As a result of the fine distribution of the doping component in the aerosol and the high temperatures (from 1000 to 2400° C.) in the subsequent flame hydrolysis, in which the doping components are under certain circumstances further comminuted and/or melted, the doping medium is present in finely divided form in the gas phase during the formation of the pyrogenic silicon dioxide, so that homogeneous incorporation of the doping component into the pyrogenically prepared silicon dioxide is possible. However, it is also possible to achieve homogeneous distribution by suitably selecting the starting salts and the manner in which the process is carried out.

The invention further provides a silicone rubber which is characterised in that it comprises as filler the hydrophobic pyrogenic silica doped with potassium by means of aerosol according to the invention.

If the hydrophobic pyrogenic silicon dioxide according to the invention is incorporated into silicone rubber, wholly novel properties of the silicone rubber are obtained.

On account of the added potassium, the morphology of the pyrogenic silicon dioxide is altered, so that a lower degree of intergrowth of the primary particles and hence a lower structure results. This silicon dioxide can be prepared according to DE 19650500.

Rendering the silicon dioxide hydrophobic also permits the incorporation of a large amount of pyrogenic silicon dioxides having a large surface area, with the result that excellent rheological properties can surprisingly be achieved, and the vulcanates exhibit unexpectedly high transparency and mechanics.

For elastomer applications, polydimethylsiloxanes having molecular weights of from 400,000 to 600,000 can be used, which polydimethylsiloxanes are prepared with the addition of regulators such as hexamethyl- or divinyltetramethyl-disiloxane and carry corresponding end groups. In order to improve the vulcanisation behaviour and also the tear-growth resistance, small amounts (<1%) of vinyl groups are often incorporated into the main chain as substituents by the addition of vinylmethyldichlorosilane (VMQ).

HTV-silicone rubber is understood to mean water-clear, highly viscous self-deliquescent silicone polymers which have a viscosity of from 15 to 30 kPas with a chain length of approximately 10,000 SiO units. Crosslinkers, fillers, catalysts, colouring pigments, antiadhesives, plasticisers, adhesion promoters are used as further constituents of the silicone rubber.

In the case of hot vulcanisation, the processing temperatures are conventionally in the range of approximately from 140 to 230° C., whereas cold vulcanisation is carried out at temperatures of from 20 to 70° C. In vulcanisation, a distinction is made between peroxidic crosslinking, addition crosslinking and condensation crosslinking.

Peroxidic crosslinking proceeds by way of a free-radical reaction mechanism, in which the peroxides decompose under the effect of temperature into radicals which attach to the vinyl or methyl groups of the polysiloxanes and produce new radicals there, which then attach to other polysiloxane chains and thus lead to spatial crosslinking. The recombination of two radicals, or the increasingly limited chain mobility as the degree of crosslinking rises, leads to the termination of the crosslinking reaction.

In the case of peroxidic crosslinking, different peroxides are used according to the processing method (e.g. extrusion, injection moulding, compression moulding) in order to adapt the rate of crosslinking to the process-specific processing conditions. For example, very high rates of crosslinking are required for extrusion, whereas low rates of crosslinking are necessary in the production of moulded articles by injection moulding or compression moulding, in order to avoid the start of crosslinking while the cavity is being filled.

The nature of the peroxide used has an effect on the structure and accordingly also on the physical properties of the vulcanate. Diaroyl peroxides (bis(2,4-dichloro-benzoyl)peroxide, dibenzoyl peroxide) crosslink both vinyl and methyl groups. With dialkyl peroxides (dicumyl peroxide, 2,5 (ditert.-butylperoxy)-2,5-dimethylhexane), on the other hand, virtually only vinyl-specific crosslinking takes place.

The Shore hardness of the vulcanate can be controlled to a certain degree by the amount of peroxide in the mixture. As the amount of peroxide increases, the Shore hardness increases owing to a higher density of crosslinking sites. However, an overdose of peroxide leads to a fall in elongation at break, tensile strength and tear-growth resistance. Depending on the application, peroxidic crosslinking requires subsequent tempering of the vulcanates in order to reduce the permanent set and remove the peroxide cleavage products. In addition to the typical aromatic odour that occurs especially with dicumyl peroxide, the cleavage products can also result in an impairment of the physical properties of the vulcanates (e.g. reversion in the case of acidic cleavage products).

In the case of the fillers, a distinction is to be made between reinforcing and non-reinforcing fillers.

Non-reinforcing fillers are characterised by extremely weak interactions with the silicone polymer. They include chalk, quartz flour, diatomaceous earth, mica, kaolin, Al(OH)$_3$ and Fe$_2$O$_3$. The particle diameters are of the order of magnitude of 0.1 μm. Their purpose is to raise the viscosity of the compounds in the unvulcanised state and to increase the Shore hardness and the modulus of elasticity of the vulcanised rubbers. In the case of surface-treated fillers, improvements in tear strength can also be achieved.

Reinforcing fillers are especially highly dispersed silicas having a surface area of >125 m$^2$/g. The reinforcing action is attributable to the bond between the filler and the silicone polymer. Such bonds are formed between the silanol groups at the surface of the silicas (3-4.5 SiOH groups/nm$^2$) and the silanol groups of the α-, ω dihydroxypolydimethylsiloxanes via hydrogen bridge bonds to the oxygen of the siloxane chain. These filler/polymer interactions result in increases in viscosity and changes in the glass transition temperature and in the crystallisation behaviour. Polymer/filler bonds bring about an improvement in the mechanical properties but can also result in crepe hardening of the rubbers.

Talcum occupies a middle position between reinforcing and non-reinforcing fillers.

Fillers are additionally used for special effects. These include iron oxide, zirconium oxide or barium zirconate for increasing the heat stability.

Silicone rubbers can comprise as further constituents catalysts, crosslinkers, colouring pigments, antiadhesives, plasticisers and adhesion promoters.

Plasticisers are required in particular to establish a low modulus of elasticity. Internal adhesion promoters are based on functional silanes which are able to interact on the one hand with the substrate and on the other hand with the crosslinking silicone polymer (use principally in RTV-1 rubbers).

Low molecular weight or monomeric silanol-rich compounds (e.g. diphenylsilanediol, H$_2$O) counteract crepe hardening. They prevent the silicone polymers from interacting too strongly with the silanol groups of the filler by reacting more rapidly with the filler. A corresponding effect can also be achieved by partially coating the filler with trimethylsilyl groups (treatment of the filler with trimethylsilanes).

It is also possible to modify the siloxane polymer chemically (phenyl polymers, boron-containing polymers) or to blend it with organic polymers (butadiene-styrene copolymers).

In a preferred embodiment of the invention, the silicone rubber may be a LSR-silicone rubber.

Liquid silicone rubber (LSR) practically corresponds to HTV in terms of molecular structure but has a mean molecule chain length that is lower by a factor of 6 and accordingly a viscosity that is lower by a factor of 1000 (from 20 to 40 Pas). Two components (A and B), are made available to the processor in equal amounts, which components already contain the fillers, vulcanising agents and, optionally, other additives.

As fillers there are used the same silicas and additives as in HTV mixtures. The low viscosity of the starting polymer requires particularly intensive incorporation and thorough kneading in specially developed mixing units if homogeneous distribution is to be achieved. In order to facilitate uptake of the filler and to avoid crepe hardening, the silica is rendered completely hydrophobic—in most cases in situ during the mixing operation and by means of hexamethyldisilazane (HMDS, also HMDZ).

The vulcanisation of LSR mixtures is carried out by means of hydrosilylation, that is to say by addition of methyl hydrogen siloxanes (having at least 3 SiH groups in the molecule) to the vinyl group of the polymer with catalysis by Pt(0) complexes in ppm amounts, the crosslinker and catalyst being present in the separate components on delivery. Special inhibitors, e.g. 1-ethynyl-1-cyclohexanol, prevent the premature start of vulcanisation after mixing of the components and establish a working life of about 3 days at room temperature. The proportions can be adjusted within a considerable range via the platinum and inhibitor concentration.

LSR mixtures are increasingly being used in the production of electrically conductive silicone rubber products because addition crosslinking, in contrast to peroxide vulcanisation, which is conventional in the case of HTV, is not disturbed by furnace blacks (in HTV mixtures, acetylene black is preferably used). Conductive furnace blacks can be mixed in and distributed more readily than graphite or metal powder, preference being given to silver. The silicone rubber according to the invention has the following advantages:

Tests on LSR (liquid silicone rubber) show that the hydrophobic doped oxides of Examples 5 and 6 according to the invention exhibit a very good incorporation and dispersing behaviour compared with aerosils (pyrogenic silicas) having the same or a similar surface area, and the compounds have very much lower viscosities and flow limits. In particular, the pronounced high transparency of the vulcanates is advantageous.

With the hydrophobic potassium-doped silicon oxides according to the invention it is possible to use materials which already bring about extremely low viscosities and flow limits owing to their low structure. They can be incorporated and dispersed very easily and quickly owing to their hydrophobic nature. Accordingly, they are not exposed to high shear forces during production of the silicone rubber mixture. The saving in terms of energy and material costs is a further advantage for the user. In addition, the silicone rubbers according to the invention exhibit improved optical properties in the form of very high transparency.

EXAMPLES

Preparation of the Powders of Low Structure

A burner arrangement as described in DE 196 50 500 is used.

Example 1

Doping with an Aerosol Prepared from a Solution of Potassium Chloride 4.44 kg/h of SiCl$_4$ are vaporised at about 130° C. and transferred to the central tube of the burner according to DE 196 50 500. 3.25 Nm$^3$/h of hydrogen as well as 5.25 Nm$^3$/h of x$_1$:air and 0.55 Nm$^3$/h of oxygen are additionally fed into that tube. This gas mixture flows from the inner burner nozzle and burns into the burner chamber of a water-cooled flame tube. In order to avoid caking, 0.5 Nm$^3$/h of (jacket) hydrogen and 0.2 Nm$^3$/h of nitrogen are additionally fed into the jacket nozzle, which surrounds the central nozzle.

40 Nm$^3$/h of air are additionally drawn into the flame tube, which is under a slight reduced pressure, from the surroundings.

The second gas component, which is introduced into the axial tube, consists of an aerosol prepared from a 2.5% aqueous KCl salt solution. The aerosol generator used is a binary nozzle which yields an atomisation output of 247 g/h aerosol. This aqueous salt aerosol is guided through externally heated pipes by means of 3.5 Nm$^3$/h of carrier air and leaves the inner nozzle with an outlet temperature of 153° C. The potassiumsalt-containing aerosol so introduced is introduced into the flame and changes the properties of the resulting pyrogenic silica accordingly.

After the flame hydrolysis, the reaction gases and the resulting pyrogenic silica doped with potassium (oxide) are drawn through a cooling system by application of a reduced pressure, and the particle gas stream is thereby cooled to approximately from 100 to 160° C. The solid is separated from the waste gas stream in a filter or cyclone. The resulting pyrogenic silica doped with potassium oxide is obtained in the form of a finely divided white powder. In a further step, residual amounts of hydrochloric acid adhering to the doped silica are removed at temperatures of from 400 to 700° C. by treatment with air containing steam.

The BET surface area of the resulting pyrogenic silica is 107 m$^2$/g. The content of analytically determined potassium oxide is 0.18 wt. %.

The preparation conditions are summarised in Table 1. The flame parameters are indicated in Table 2, and further analytical data of the resulting silica are given in Table 3.

Example 2

Doping with an Aerosol Prepared from a Solution of Potassium Chloride

The procedure is as indicated in Example 1:

4.44 kg/h of SiCl$_4$ are vaporised at about 130° C. and transferred to the central tube of the burner according to DE 196 50 500. 4.7 Nm$^3$/h of hydrogen as well as 5.7 Nm$^3$/h of air and 1.15 Nm$^3$/h of oxygen are additionally fed into that tube. This gas mixture flows from the inner burner nozzle and burns into the burner chamber of a water-cooled flame tube. In order to avoid caking, 0.5 Nm$^3$/h of (jacket) hydrogen and 0.2 Nm$^3$/h of nitrogen are additionally fed into the jacket nozzle, which surrounds the central nozzle.

25 Nm$^3$/h of air are additionally drawn into the flame tube, which is under a slight reduced pressure, from the surroundings.

The second gas component, which is introduced into the axial tube, consists of an aerosol prepared from a 9% aqueous KCl salt solution. The aerosol generator used is a binary nozzle which yields an atomisation output of 197 g/h aerosol. This aqueous salt aerosol is guided through externally heated pipes by means of 4 Nm$^3$/h of carrier air and leaves the inner nozzle with an outlet temperature of 123° C. The potassium-salt-containing aerosol so introduced changes the properties of the resulting pyrogenic silica accordingly.

After the flame hydrolysis, the reaction gases and the resulting pyrogenic doped silica are drawn through a cooling system by application of a reduced pressure, and the particle gas stream is thereby cooled to approximately from 100 to 160° C. The solid is separated from the waste gas stream in a filter or cyclone.

The resulting pyrogenic silica doped with potassium (oxide) is obtained in the form of a finely divided white powder. In a further step, residual amounts of hydrochloric acid adhering to the silica are removed at temperatures of from 400 to 700° C. by treatment with air containing steam.

The BET surface area of the pyrogenic silica is 127 m$^2$/g.

The preparation conditions are summarised in Table 1. The flame parameters are indicated in Table 2, and further analytical data of the resulting silica are given in Table 3.

Example 3

Doping with an Aerosol Prepared from a Solution of Potassium Chloride 4.44 kg/h of SiCl$_4$ are vaporised at about 130° C. and transferred to the central tube of the burner according to DE 196 50 500. 2.5 Nm$^3$/h of hydrogen as well as 7 Nm$^3$/h of oxygen are additionally fed into that tube. This gas mixture flows from the inner burner nozzle and burns into the burner chamber of a water-cooled flame tube. In order to avoid caking, 0.3 Nm$^3$/h of (jacket) hydrogen and 0.2 Nm$^3$/h of nitrogen are additionally fed into the jacket nozzle, which surrounds the central nozzle.

45 Nm$^3$/h of air are additionally drawn into the flame tube, which is under a slight reduced pressure, from the surroundings.

The second gas component, which is introduced into the axial tube, consists of an aerosol prepared from a 2.48% aqueous KCl salt solution. The aerosol generator used is a binary nozzle which yields an atomisation output of 204 g/h aerosol. This aqueous salt aerosol is guided through externally heated pipes by means of 3.5 Nm$^3$/h of carrier air and leaves the inner nozzle with an outlet temperature of 160° C. The potassium-salt-containing aerosol so introduced changes the properties of the resulting pyrogenic silica accordingly.

After the flame hydrolysis, the reaction gases and the resulting pyrogenic silica doped with potassium (oxide) are drawn through a cooling system by application of a reduced pressure, and the particle gas stream is thereby cooled to approximately from 100 to 160° C. The solid is separated from the waste gas stream in a filter or cyclone.

The resulting pyrogenic silica doped with potassium (oxide) is obtained in the form of a finely divided white powder. In a further step, residual amounts of hydrochloric acid adhering to the silica are removed at temperatures of from 400 to 700° C. by treatment with air containing steam.

The BET surface area of the resulting pyrogenic silica is 208 m$^2$/g. The content of analytically determined potassium oxide is 0.18 wt. %.

The preparation conditions are summarised in Table 1. The flame parameters are indicated in Table 2, and further analytical data of the resulting silica are given in Table 3.

Example 4

Doping with an Aerosol Prepared from a Solution of Potassium Chloride 4.44 kg/h of SiCl$_4$ are vaporised at about 130° C. and transferred to the central tube of the burner of known construction according to DE 196 50 500. 2.0 Nm$^3$/h of hydrogen as well as 6.7 Nm$^3$/h of air are additionally fed into that tube. This gas mixture flows from the inner burner nozzle and burns into the burner chamber of a water-cooled flame tube. In order to avoid caking, 0.3 Nm$^3$/h of (jacket) hydrogen and 0.2 Nm$^3$/h of nitrogen are additionally fed into the jacket nozzle, which surrounds the central nozzle.

35 Nm$^3$/h of air are additionally drawn into the flame tube, which is under a slight reduced pressure, from the surroundings. The second gas component, which is introduced into the axial tube, consists of an aerosol prepared from a 2.48% aqueous KCl salt solution. The aerosol generator used is a binary nozzle which yields an atomisation output of 246 g/h aerosol. This aqueous salt aerosol is guided through externally heated pipes by means of 3.5 Nm$^3$/h of carrier air and leaves the inner nozzle with an outlet temperature of 160° C.

The potassium-salt-containing aerosol so introduced is introduced into the flame and changes the properties of the resulting pyrogenic silica accordingly.

After the flame hydrolysis, the reaction gases and the resulting pyrogenic silica doped with potassium (oxide) are drawn through a cooling system by application of a reduced pressure, and the particle gas stream is thereby cooled to approximately from 100 to 160° C. The solid is separated from the waste gas stream in a filter or cyclone.

The resulting pyrogenic silica doped with potassium (oxide) is obtained in the form of a finely divided white powder. In a further step, residual amounts of hydrochloric acid adhering to the doped silica are removed at temperatures of from 400 to 700° C. by treatment with air containing steam.

The BET surface area of the resulting pyrogenic silica is 324 $m^2/g$. The content of analytically determined potassium oxide is 0.18 wt. %.

The preparation conditions are summarised in Table 1. The flame parameters are indicated in Table 2, and further analytical data of the resulting silica are given in Table 3.

TABLE 1

Experimental conditions in the preparation of doped pyrogenic silica

| No. | $SiCl_4$ kg/h | Primary air $Nm^3/h$ | $O_2$ add. $Nm^3/h$ | $H_2$ core $Nm^3/h$ | $H_2$ jacket $Nm^3/h$ | $N_2$ jacket $Nm^3/h$ | Gas temp. °C. | Potassium salt solution KCl-wt. % | Amount of aerosol g/h | Aeros. air $Nm^3/h$ | BET $m^2/g$ |
|---|---|---|---|---|---|---|---|---|---|---|---|
| 1 | 4.44 | 5.25 | 0.55 | 3.25 | 0.5 | 0.2 | 153 | 2.5 | 247 | 3.5 | 107 |
| 2 | 4.44 | 5.7 | 1.15 | 4.7 | 0.5 | 0.2 | 123 | 9 | 195 | 4 | 127 |
| 3 | 4.44 | 7 | 0 | 2.5 | 0.3 | 0.2 | 160 | 2.48 | 204 | 3.5 | 208 |
| 4 | 4.44 | 6.7 | 0 | 2.0 | 0.3 | 0.2 | 139 | 2.48 | 246 | 3.5 | 324 |

Explanation:
Primary air = amount of air in the central tube;
$H_2$ core = hydrogen in the central tube;
Gas temp. = gas temperature at the nozzle of the central tube;
Amount of aerosol = mass flow rate of the salt solution converted to aerosol form;
Aerosol air = amount of carrier gas (air) in the aerosol

TABLE 2

Flame parameters in the preparation of doped pyrogenic silica

| No. | Gamma core [—] | Lambda core [—] | $vk_{norm}$ [m/sec] |
|---|---|---|---|
| 1 | 2.77 | 1.01 | 20.8 |
| 2 | 4.00 | 1.00 | 25.9 |
| 3 | 2.13 | 1.17 | 21.6 |
| 4 | 1.71 | 1.40 | 20.0 |

Explanation:
Gamma core = proportion of hydrogen in the central tube;
Lambda core = proportion of oxygen in the central tube; for the precise calculation and definition of gamma and lambda see EP 0 855 368;
$vk_{norm}$ = outflow speed under standard conditions (273 K, 1 atm).

TABLE 3

Analytical data of the samples obtained according to Examples 1 to 4

| No. | BET $[m^2/g]$ | pH 4% aqueous dispersion [—] | Potassium content as $K_2O$ [wt. %] | DBP at 16 g weighed amount in [g/100 g] | Bulk density [g/l] | Tamped density [g/l] |
|---|---|---|---|---|---|---|
| 1 | 107 | 7.07 | 0.18 | n.e. | 24 | 32 |
| 2 | 127 | 7.71 | 0.316 | n.e. | 31 | 42 |
| 3 | 208 | 6.66 | 0.15 | 234 | 19 | 25 |
| 4 | 324 | 6.35 | 0.18 | 305 | 17 | 22 |

Explanation:
pH 4% sus. = pH value of the 4% aqueous suspension;
DBP = dibutyl phthalate absorption,
n.e. = device does not detect an end point.

EXAMPLES

Operation of Rendering Hydrophobic

Preparation of Example 5

2.5 kg of the hydrophilic K-doped silica described in Example 3 are placed in a mixer and sprayed, with intensive mixing, first with 0.125 kg of water and then, by means of a binary nozzle, with 0.3 kg of hexamethyldisilazane. When the spraying is complete, mixing is continued for a further 15 minutes, followed by tempering for 5 hours at 25° C. and then for 2 hours at 120° C.

Preparation of Example 6

2.5 kg of the hydrophilic K-doped silica described in Example 4 are placed in a mixer and sprayed, with intensive mixing, first with 0.125 kg of water and then, by means of a binary nozzle, with 0.45 kg of hexamethyldisilazane. When the spraying is complete, mixing is continued for a further 15 minutes, followed by tempering for 5 hours at 25° C. and then for 2 hours at 120° C.

Testing of the Hydrophobic Pyrogenic Silicas Doped with Potassium According to the Invention in Silicone Rubber

TABLE 4

Analytical data

| | BET surface area [m²/g] | pH value | K₂O content [wt. %] | Tamped density [g/l] | Loss on drying [%] |
|---|---|---|---|---|---|
| Ex. 5 | 163 | 9.1 | 0.15 | 38 | 0.8 |
| Ex. 6 | 232 | 9.0 | 0.18 | 40 | 1.2 |

The products from Table 4 are tested in a LSR-silicone formulation. The hydrophilic starting products of aerosil (pyrogenically prepared silica) having a comparable surface area are used as comparative material.

LSR-Silicone Rubber

In a planetary dissolver, 20% silica are incorporated at a slow speed (50/500 $min^{-1}$ planetary mixer/dissolver plate) and then dispersed for 30 minutes at high speed (100/2000 $min^{-1}$).

After the incorporation, the mixture forms a flowable mass of low viscosity. After the 30-minute dispersion, the viscosity falls slightly.

While the hydrophilic starting products could not be incorporated in the same manner or could be incorporated only in a low concentration, Examples 5 and 6 can readily be incorporated and exhibit decidedly good wettability and very low rheological properties, the flow limit in particular, as a measure of the flowability, being close to 0 Pa.

In the same concentration, the hydrophobic comparative silicas can no longer be incorporated owing to the too high thickening effect (Table 5).

TABLE 5

Rheological properties with 20% silica

| Silica | Flow limit [Pa] | Viscosity D = 10 $s^{-1}$ [Pa · s] |
|---|---|---|
| Ex. 3* | — | — |
| Ex. 4* | — | — |
| Ex. 5 | 0 | 350 |
| Ex. 6 | 0 | 326 |

*The products cannot be incorporated in this concentration (20%) owing to the too high thickening effect.

The mixtures are then crosslinked, the standard formulation (optimised for a hydrophobic filler having a loss on drying of not more than 0.3%) being so changed that the amount of crosslinker (catalyst and inhibitor remain unchanged) is increased according to the higher loss on drying of the hydrophilic fillers used.

TABLE 6

Mechanical and optical properties of the vulcanates with 20% silica

| Silica | Tensile strength [N/mm²] | Ultimate elongation [%] | Tear-growth resistance [N/mm] | Hardness [Shore A] | Rebound resilience [%] | Transparency [DE/D65] |
|---|---|---|---|---|---|---|
| Ex. 5 | 3.9 | 244 | 3 | 48 | 62 | 35 |
| Ex. 6 | 4.3 | 304 | 21 | 44 | 62 | 53 |

The results of the mechanical and optical test are summarised in Table 6. Particular mention should be made of the extraordinarily high transparency of the mixture according to Example 6, which cannot be achieved with any other product. The high tear-growth resistance of the mixture comprising the silicas according to the invention is also surprising.

The invention claimed is:

1. A low structure surface-modified pyrogenically prepared silicon dioxide doped with potassium which has been prepared pyrogenically by flame hydrolysis and which has been doped with from 0.000001 to 40 wt. % potassium and is further characterized as having a hydrophobic surface and a DBP absorption of the pyrogenic silica has an endpoint which is not detectable or is less than 85% of the value of a pyrogenic silica educt having a comparable surface area and, wherein the potassium content of the potassium doped silicon dioxide before surface modification is from 0.15 to 0.32 wt. % in the form of $K_2O$.

2. A low structure surface-modified pyrogenically prepared silicon dioxide doped with potassium according to claim 1, wherein surface modification includes contact with one or more compounds from the following groups:
  a) organosilanes of the formula $(RO)_3Si(C_nH_{2n+1})$ and $(RO)_3Si(C_nH_{2n-1})$
  R=alkyl
  n=1-20
  b) organosilanes of the formula $R'_x(RO)_ySi(C_nH_{2n+1})$ and $R'_x(RO)_ySi(C_nH_{2n-1})$
  R=alkyl
  R'=alkyl or cycloalkyl
  n=1-20
  x+y=3
  x=1,2
  y=1,2
  c) haloorganosilanes of the formula $X_3Si(C_nH_{2n+1})$ and $X_3Si(C_nH_{2n-1})$
  X=Cl or Br
  n=1-20
  d) haloorganosilanes of the formula $X_2(R')Si(C_nH_{2n+1})$ and $X_2(R')Si(C_nH_{2n-1})$
  X=Cl or Br
  R'=alkyl
  R'=cycloalkyl
  n=1-20
  e) haloorganosilanes of the formula $X(R')_2Si(C_nH_{2n+1}))$ and $X(R')_2Si(C_nH_{2n-1})$
  X=Cl or Br
  R'=alkyl
  R'=cycloalkyl
  n=1-20 f) organosilanes of the formula $(RO)_3Si(CH_2)_m$—R'
 R=alkyl
 m=0,1-20
 R'=methyl, aryl, substituted aryl,
  —$C_4F_9$, $OCF_2$—CHF—$CF_3$, —$C_6F_{13}$, —O—$CF_2$—$CHF_2$,
  —$NH_2$, —$N_3$, —SCN, —CH=$CH_2$, —NH—$CH_2$—$CH_2$—$NH_2$,
  —N—$(CH_2$—$CH_2$—$NH_2)_2$,
  —OOC$(CH_3)$C=$CH_2$,
  —$OCH_2$—CH(O)$CH_2$,
  —NH—CO—N—CO—$(CH_2)_5$,
  —NH—COO—$CH_3$, —NH—COO—$CH_2$—$CH_3$,
  and —NH—$(CH_2)_3Si(OR)_3$,
  —$S_x$—$(CH_2)_3Si(OR)_3$, wherein X=from 1 to 10 and R=alkyl,
  —SH,
  —NR'R''R''' (R'=alkyl, aryl, substituted aryl; R''=H, alkyl, aryl; R'''=H, alkyl, aryl, benzyl, $C_2H_4$NR''''R''''' where R''''=H, alkyl and R'''''=H, alkyl)

g) organosilanes of the formula $(R'')_x(RO)_ySi(CH_2)_m$—R', $R''$ = alkyl   $x + y = 2$
      = cycloalkyl   $x = 1, 2$
               $y = 1, 2$
      $m$ = from 0, 1 to 20

R'=methyl, aryl, substituted aryl,
  —$C_4F_9$, —$OCF_2$—CHF—$CF_3$, —$C_6F_{13}$, —O—$CF_2$—$CHF_2$
  —$NH_2$, —$N_3$, —SCN, —CH=$CH_2$, —NH—$CH_2$—$CH_2$—$NH_2$,
  —N—$(CH_2$—$CH_2$—$NH_2)_2$
  —OOC$(CH_3)$C=$CH_2$
  —$OCH_2$—CH(O)$CH_2$
  —NH—CO—N—CO—$(CH_2)_5$
  —NH—COO—$CH_3$, —NH—COO—$CH_2$—$CH_3$,
  —NH—
  —$S_x$—$(CH_2)_3Si(OR)_3$, wherein X=from 1 to 10 and R=alkyl,
  —SH,
  —NR'R''R''' (R'=alkyl, aryl; R''=H, alkyl, aryl; R'''=H, alkyl, aryl, benzyl, $C_2H_4$NR''''R''''' where R''''=H, alkyl and R'''''=H, alkyl)

h) haloorganosilanes of the formula $X_3Si(CH_2)_m$—R'
 X=Cl or Br
 m=0,1-20
 R'=methyl, aryl substituted aryl
  —$C_4F_9$, —$OCF_2$—CHF—$CF_3$, —$C_6F_{13}$, —O—$CF_2$—$CHF_2$
  —$NH_2$, —$N_3$, —SCN, —CH=$CH_2$,
  —NH—$CH_2$—$CH_2$—$NH_2$,
  —N—$(CH_2$—$CH_2$—$NH_2)_2$
  —OOC$(CH_3)$C=$CH_2$
  —$OCH_2$—CH(O)$CH_2$
  —NH—CO—N—CO—$(CH_2)_5$
  —NH—COO—$CH_3$, —NH—COO—$CH_2$—$CH_3$,
  —NH—$(CH_2)_3Si(OR)_3$,
  —$S_x$—$(CH_2)_3Si(OR)_3$, wherein X=from 1 to 10 and R=alkyl,
  —SH i) haloorganosilanes of the formula $(R)X_2Si(CH_2)_m$—R'
 X=C or Br
 R=alkyl
 m=0,1-20
 R'=methyl, substituted aryl
  —$C_4F_9$, —$OCF_2$—CHF—$CF_3$, —$C_6F_{13}$, —O—$CF_2$—$CHF_2$
  —$NH_2$, —$N_3$, —SCN, —CH=$CH_2$, —NH—$CH_2$—$CH_2$—$NH_2$, —N—$(CH_2$—$CH_2$—$NH_2)_2$
  —OOC$(CH_3)$C=$CH_2$
  —$OCH_2$—CH(O)$CH_2$
  —NH—CO—N—CO—$(CH_2)_5$
  —NH—COO—$CH_3$, —NH—COO—$CH_2$—$CH_3$,
  —NH—$(CH_2)_3Si(OR)_3$
  —$S_x$—$(CH_2)_3Si(OR)_3$, wherein X=from 1 to 10 and R=alkyl,
  —SH j) haloorganosilanes of the formula $(R)_2X\,Si(CH_2)_m$—R'
 X=Cl, Br
 R=alkyl
 m=0,1-20
 R'=methyl, aryl substituted aryl
  —$C_4F_9$, —$OCF_2$—CHF—$CF_3$, —$C_6F_{13}$, —O—$CF_2$—$CHF_2$
  —$NH_2$, —$N_3$, —SCN, —CH=$CH_2$, —NH—$CH_2$—$CH_2$—$NH_2$,
  —N—$(CH_2$—$CH_2$—$NH_2)_2$
  —OOC$(CH_3)$C=$CH_2$
  —$OCH_2$—CH(O)$CH_2$
  —NH—CO—N—CO—$(CH_2)_5$
  —NH—COO—$CH_3$, —NH—COO—$CH_2$—$CH_3$,
  —NH—$(CH_2)_3Si(OR)_3$
  —$S_x$—$(CH_2)_3Si(OR)_3$, wherein X=from 1 to 10 and R=alkyl,
  —SH k) silazanes of the formula

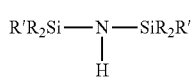

R=alkyl
 R'=alkyl, vinyl l) cyclic polysiloxanes of the formula D 3, D 4, D 5, having 3, 4 or 5 units of the structure (—O)—(-) $Si(CH_3)_2$—, respectively; and m) polysiloxanes or silicone oils of the formula

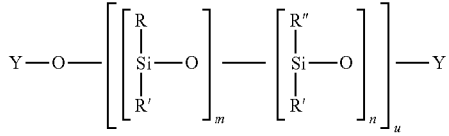

m=0,1,2,3, ... ∞
 n=0,1,2,3, ... ∞
 u=0,1,2,3, ... ∞
 Y=$CH_3$, H, $C_nH_{2n+1}$ n=1-20
 Y=$Si(CH_3)_3$, $Si(CH_3)_2H$
 $Si(CH_3)_2OH$, $Si(CH_3)_2(OCH_3)$
 $Si(CH_3)_2(C_nH_{2n+1})$ n=1-20
 R=alkyl, aryl, $(CH_2)_n$—$NH_2$, H
 R'=alkyl, aryl, $(CH_2)_n$—$NH_2$, H
 R'=alkyl, aryl, $(CH_2)_n$—$NH_2$, H
 R'=alkyl, aryl, $(CH_2)_n$—$NH_2$, H.

3. The low structure surface-modified pyrogenically prepared silicon dioxide doped with potassium according to claim 2 wherein R' in formula (f), (g), (h), (i) and (j) is —$C_6H_5$ or substituted phenyl, and R is methyl, ethyl, propyl or butyl.

4. Process for the preparation of the low structure surface-modified doped pyrogenically prepared silicon dioxide according to claim 1, comprising doping pyrogenically prepared silicon dioxide with potassium by means of an aerosol by placing the silicon dioxide in a suitable mixing vessel, then spraying the silicon dioxide, with intensive mixing, optionally first with water and/or dilute acid and then with a surface-modifying reagent or with a mixture of a plurality of surface-modifying reagents, and optionally continuing mixing for a further 15 to 30 minutes, followed by tempering at a temperature of from 100 to 400° C. for a period of from 1 to 6 hours.

5. Process for the preparation of the low structure surface-modified doped pyrogenically prepared silicon dioxide doped with potassium by means of aerosol according to claim 1, comprising, with the exclusion of oxygen, mixing the silicon dioxide as homogeneously as possible with the surface-modifying reagent to produce a mixture, then heating the mixture together with an inert gas, to temperatures of from 200 to 800° C., in a continuous uniflow process in a treatment chamber which is in the form of a vertical tubular furnace, separating solid and gaseous reaction products from one another, and then optionally deacidifying and drying the solid products.

6. The process according to claim 5 wherein the temperature is 400° to 600° C.

7. A method of preparing a silicon rubber comprising incorporating therein the low structure surface-modified doped pyrogenically prepared silicon dioxide according to claim 1.

8. Silicone rubber containing as filler the low structure surface-modified doped pyrogenically prepared silica according to claim 1.

9. Silicone rubber according to claim 8, wherein the low structure surface-modified doped pyrogenically prepared silica has BET surface area from 10 to 1000 $m^2/g$.

10. Silicone rubber according to claim 8, which is a LSR silicone rubber.

11. A low structure surface-modified pyrogenically prepared silicon dioxide doped with potassium according to claim 1, wherein surface modification compound is hexamethyldisilazane.

12. Process for the preparation of the low structure surface-modified doped pyrogenically prepared silicon dioxide according to claim 11, comprising doping pyrogenically prepared silicon dioxide with potassium by means of an aerosol by placing the silicon dioxide in a suitable mixing vessel, then spraying the silicon dioxide, with intensive mixing, optionally first with water and/or dilute acid and then with hexamethyldisilazane or a mixture thereof, and optionally continuing mixing for a further 15 to 30 minutes, followed by tempering at a temperature of from 100 to 400° C. for a period of from 1 to 6 hours.

* * * * *